United States Patent
Totsuka et al.

(10) Patent No.: US 11,050,317 B2
(45) Date of Patent: Jun. 29, 2021

(54) ROTARY ELECTRIC MACHINE AND MANUFACTURING METHOD THEREOF

(71) Applicant: Mitsubishi Electric Corporation, Tokyo (JP)

(72) Inventors: Fumitaka Totsuka, Tokyo (JP); Yoshiki Kuwahara, Tokyo (JP); Yoshiaki Kitta, Tokyo (JP); Kohei Kawata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/232,622

(22) Filed: Dec. 26, 2018

(65) Prior Publication Data
US 2019/0379253 A1    Dec. 12, 2019

(30) Foreign Application Priority Data
Jun. 6, 2018    (JP) .............................. JP2018-108314

(51) Int. Cl.
*H02K 3/52*    (2006.01)
*H02K 3/38*    (2006.01)
(Continued)

(52) U.S. Cl.
CPC .............. *H02K 3/522* (2013.01); *H02K 3/38* (2013.01); *H02K 15/0062* (2013.01);
(Continued)

(58) Field of Classification Search
CPC .. H02K 3/38; H02K 2203/09; H02K 2203/12; H02K 3/50; H02K 15/0062; H02K 15/105
(Continued)

(56) References Cited

U.S. PATENT DOCUMENTS 2,870,241 A * 1/1959 Warren ................... H01R 4/14
174/94 R
2007/0040458 A1 2/2007 Fujita et al.
(Continued)

FOREIGN PATENT DOCUMENTS

DE    102009045551 A1 * 5/2010 ............. H02K 7/006
JP    4111315 B2    7/2008
(Continued)

OTHER PUBLICATIONS

Baba (WO 2015093182 A1) English Translation (Year: 2015).*
(Continued)

*Primary Examiner* — Tulsidas C Patel
*Assistant Examiner* — Robert E Mates
(74) *Attorney, Agent, or Firm* — Sughrue Mion, PLLC; Richard C. Turner

(57) ABSTRACT

It is realized that a shape of a bus ring is simplified, and a rotary electric machine is downsized. A coil connecting portion, which is protruded from bus ring maintaining portions to a shaft direction, is provided at a bus ring, and coil terminals are arranged in such a way that the coil terminals are protruded toward an outer side in a diameter direction with respect to the coil connecting portion, and the coil terminals and the coil connecting portion are connected by performing a resistance welding process. Thereby, it is not required that a slit and a bent portion or the like are formed at a tip of the bus ring, and a shape of the bus ring is simplified. Moreover, a welding board for a welding process and a chuck board for a connecting portion are not required, so that a rotary electric machine can be downsized.

10 Claims, 9 Drawing Sheets

(51) Int. Cl.
　　　*H02K 15/00*　　(2006.01)
　　　*H02K 15/10*　　(2006.01)
(52) U.S. Cl.
　　　CPC ....... *H02K 15/105* (2013.01); *H02K 2203/09* (2013.01); *H02K 2203/12* (2013.01)
(58) Field of Classification Search
　　　USPC .......................................................... 310/71
　　　See application file for complete search history.

(56) References Cited

U.S. PATENT DOCUMENTS

| | | | |
|---|---|---|---|
| 2014/0183993 A1 | 7/2014 | Takasaki | |
| 2014/0338716 A1* | 11/2014 | Nakajima | H01L 35/22 136/212 |
| 2016/0111933 A1* | 4/2016 | Takimoto | H02K 1/148 310/43 |
| 2016/0308406 A1* | 10/2016 | Kitora | H02K 3/522 |

FOREIGN PATENT DOCUMENTS

| | | | | |
|---|---|---|---|---|
| JP | 2016058453 A | | 4/2016 | |
| JP | 6279122 B1 | * | 2/2018 | ............... H02K 3/52 |
| JP | 6279122 B1 | | 2/2018 | |
| WO | 2005/072902 A1 | | 8/2005 | |
| WO | 2013/042248 A1 | | 3/2013 | |
| WO | WO-2014020755 A1 | * | 2/2014 | ............. H02K 3/325 |
| WO | WO-2015093182 A1 | * | 6/2015 | ............... H02K 3/28 |
| WO | 2018/092209 A1 | | 5/2018 | |

OTHER PUBLICATIONS

Inoue (JP-6279122-B1) English Translation (Year: 2018).*
Oga (WO 2014020755 A1) English Translation (Year: 2014).*
Cudok (DE 102009045551 A1) English Translation (Year: 2010).*
Notice of Reasons for Refusal dated Dec. 24, 2019 from the Japanese Patent Office in application No. 2018-108314.
Communication dated Sep. 17, 2019, from the Japanese Patent Office in counterpart Application No. 2018-108314.
Communication dated Jul. 23, 2019 from Japanese Patent Office in counterpart JP Application No. 2018-108314.
Office Action dated Nov. 5, 2020 in Chinese Application No. 201910446592.2.

* cited by examiner

ROTARY ELECTRIC MACHINE AND MANUFACTURING METHOD THEREOF

BACKGROUND OF THE INVENTION

Field of the Invention

The present invention relates to a rotary electric machine such as a generator, an electric motor, and an electric generator, and relates to a manufacturing method of the rotary electric machine.

Description of the Related Art

As a connection method of a bus ring and a coil in a conventional rotary electric machine, there is a method in which a slit, by which a tip portion of the bus ring is longitudinally divided, is formed, and a coil terminal is arranged in the slit so as to be connected by using a TIG welding method. The TIG welding method is used as a welding method in which an electric current is flowed, in an inert gas, to a tungsten electrode, which is a non-consumable electrode, and a high temperature arc is caused between a welding material and the tungsten electrode, whereby the welding material is welded. For example in Patent Document 1, protruding flakes at both sides, by which the slit of the bus ring is sandwiched, are formed in a tapered shape, whereby the protruding flakes are easily welded.
[Patent Document 1] Japanese Patent Publication No. 4111315

In a connection method which is disclosed in Patent Document 1, a slit and a bent portion are formed at a tip of a bus ring, so that there is a problem in which a shape of the bus ring is complicated. Moreover, a welding board for a TIG welding method and a chuck board for a connecting portion are required, so that a height of a welding portion is enhanced, and it is prevented that a rotary electric machine is downsized.

SUMMARY OF THE INVENTION

The present invention has been made to disclose a technology by which the above-described problems are solved, and an object of the invention is to simplify a shape of a bus ring, and to downsize a rotary electric machine.

A rotary electric machine, which is disclosed in the present invention, includes a stator which includes a stator core which includes teeth which are protruded from inner circumference wall surfaces of core back portions having an arc shape, bobbins which are made of a resin and are respectively arranged on end surfaces in a shaft direction at both sides of the stator core, and coils which are wound around the teeth via the bobbins; and a rotor which is rotatably arranged at an inner circumference side of the stator; wherein the bobbins, which are arranged on at least one of the end surfaces in a shaft direction of the stator core, include coil winding portions, which are arranged at end surfaces in a shaft direction of the teeth, on which the coils are wound; and flange portions, which are arranged at end surfaces in a shaft direction of the core back portions, at which a plurality of bus ring maintaining portions are formed, and a plurality of bus rings, which are made of a plane sheet having a band shape, are concentrically arranged in a state where the bus rings are inserted to the bus ring maintaining portions, and each of the bus rings includes coil connecting portions which are protruded from the bus ring maintaining portions to a shaft direction, and terminals of the coils are arranged in such a way that the terminals of the coils are protruded toward an outer side in a diameter direction with respect to the coil connecting portions, and the terminals of the coils are connected to plane tip portions of the coil connecting portions.

A manufacturing method of a rotary electric machine, which is disclosed in the present invention, includes a first step in which a plurality of bus rings, which are made of a plane sheet having a band shape, are inserted to bus ring maintaining portions having a ditch shape, which are formed at bobbins which are arranged on at least one of end surfaces in a shaft direction of a stator core; a second step in which terminals of the coils, which are connection objects, are arranged at coil connecting portions, which are protruded from the bus ring maintaining portions to a shaft direction, of each of the bus rings; and a third step in which electrodes are respectively arranged at the terminals of the coils which are arranged at the adjacent coil connecting portions, and the electrodes are energized while the electrodes are pressed in a direction of the coil connecting portions, and resistance welding processes of the terminals of the coils are concurrently performed to the coil connecting portions at two positions.

According to the rotary electric machine which is disclosed in the present invention, the coil connecting portions, which are protruded from the bus ring maintaining portions to a shaft direction, are provided at the each of the bus rings, and the terminals of the coils are connected to the tip portions, which have a plane shape, of the coil connecting portions, so that it is not required that a slit and a bent portion are formed, like a conventional rotary electric machine, at a tip of a bus ring, and a shape of the bus rings is simplified, and it can be realized that the rotary electric machine is downsized. Moreover, the terminals of the coils are arranged in such a way that the terminals of the coils are protruded toward an outer side in a diameter direction, so that the fillets are formed between the end surfaces of the coil connecting portions and the protruding portions of the terminals of the coils, so that a high connection strength is obtained.

According to the manufacturing method of the rotary electric machine, which is disclosed in the present invention, the resistance welding processes of the terminals of the coils are concurrently performed to the coil connecting portions at two positions, so that a productivity is improved in comparison with a case in which the terminals of the coils are welded at every one position. Moreover, the electrodes are arranged at the coil terminals which are arranged at the adjacent coil connecting portions, and the electrodes are energized, so that the energization passage can be shortened, and the damage, which is caused by heat, to the coils and the bobbin can be inhibited. Moreover, the terminals of the coils are welded while the terminals of the coils are pressed in a direction of the coil connecting portions, so that it can be prevented that the positions of the terminals of the coils are deviated, and a stable welding process, of which reliability is high, can be performed. Moreover, a welding board for a welding process and a chuck board for a connecting portion are not required so that it can be realized that the rotary electric machine is downsized.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
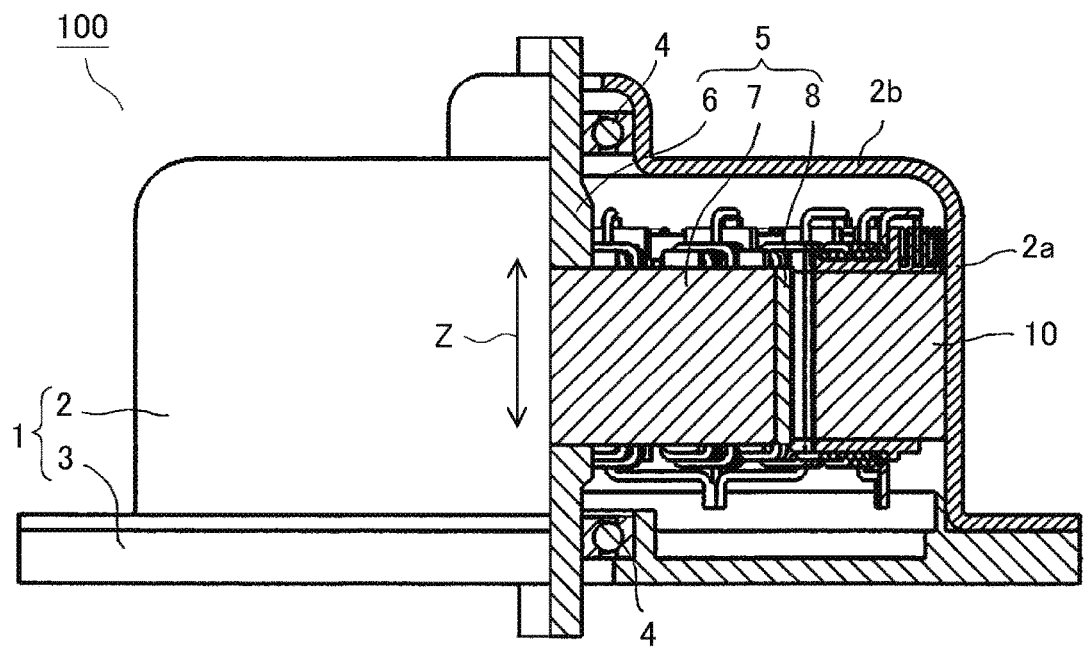
FIG. 1 is a one-side cross-sectional view which indicates a rotary electric machine according to Embodiment 1.
Figure 2:
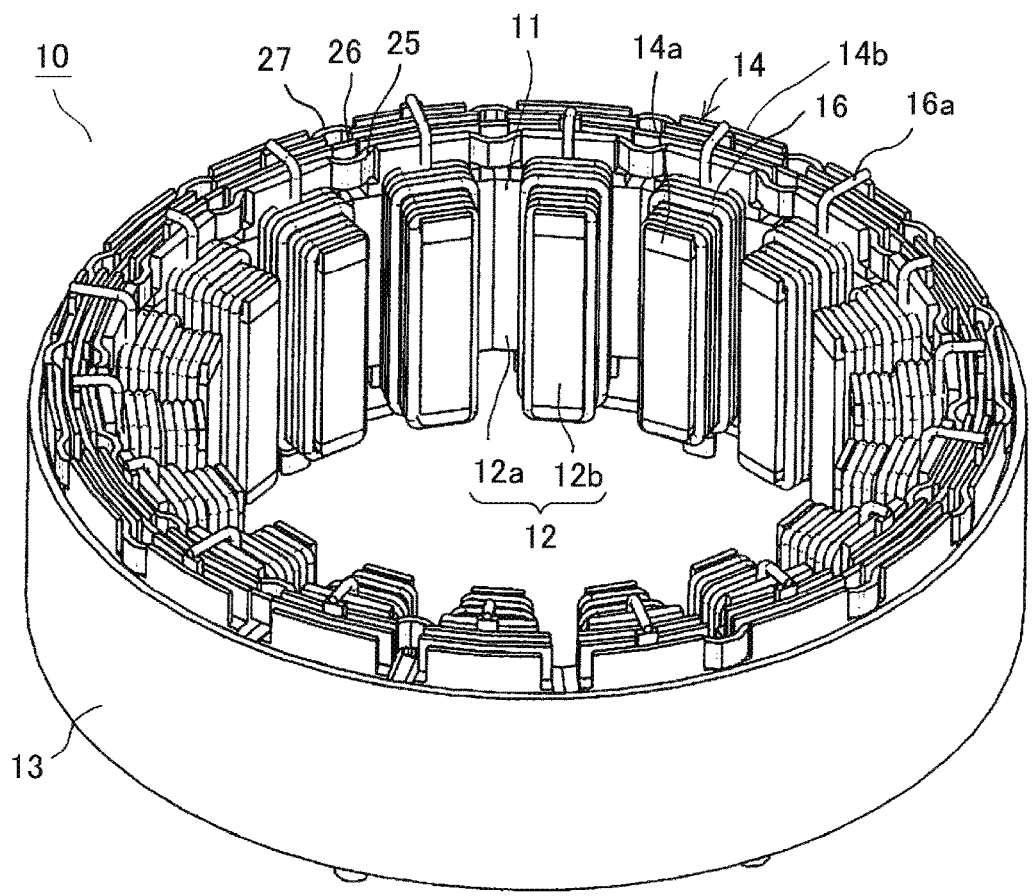
FIG. 2 is an oblique perspective view in which a stator of the rotary electric machine according to Embodiment 1 is viewed from one end side in a shaft direction.
Figure 3:
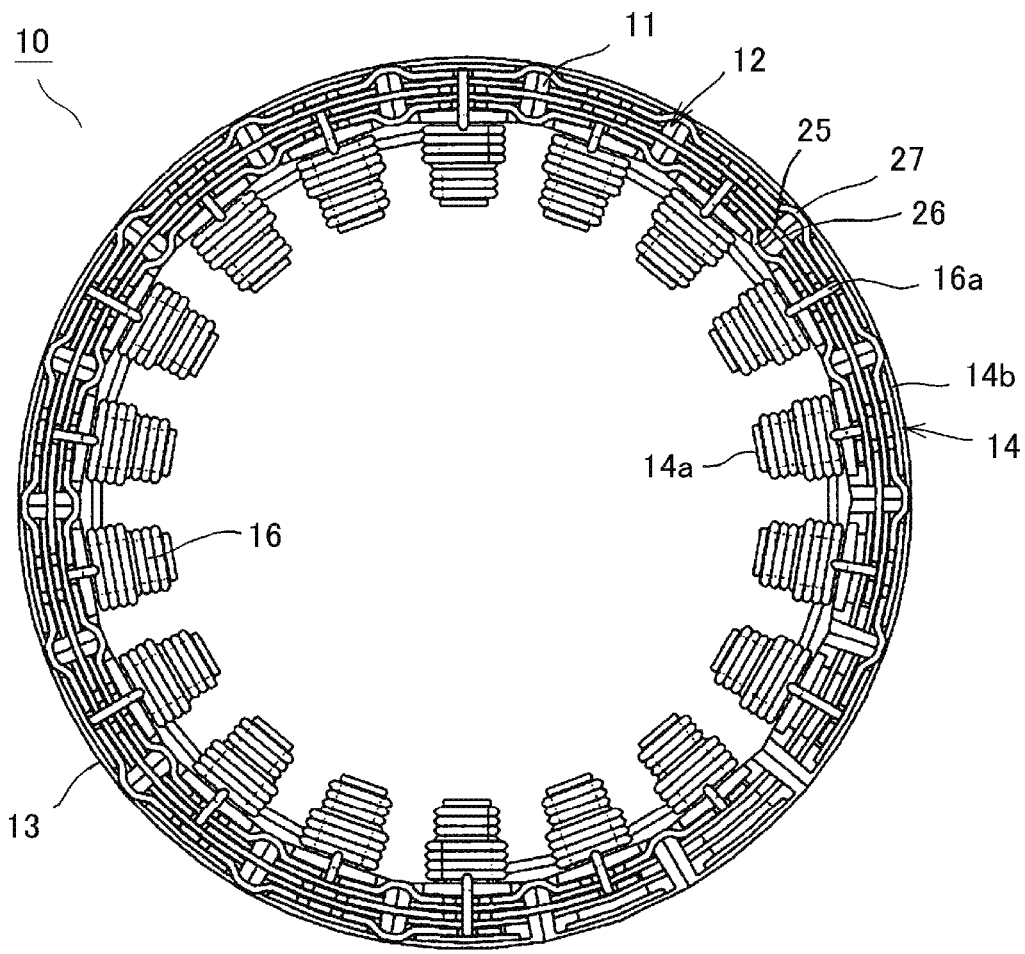
FIG. 3 is a plane view in which the stator of the rotary electric machine according to Embodiment 1 is viewed from one end side in a shaft direction.
Figure 4:
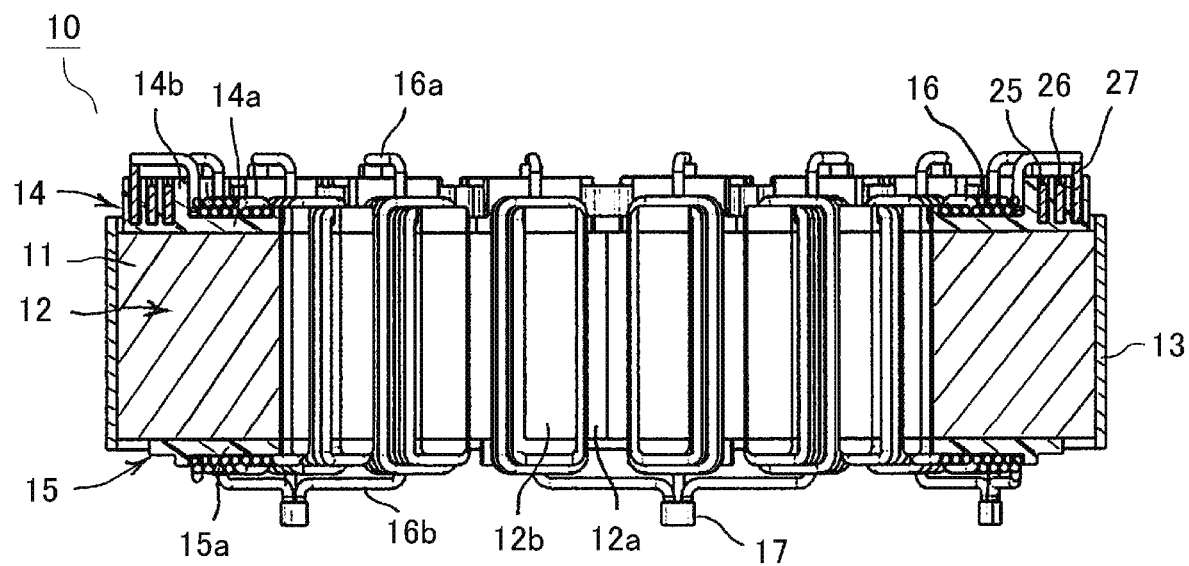
FIG. 4 is a cross-sectional view which indicates the stator of the rotary electric machine according to Embodiment 1.
Figure 5:
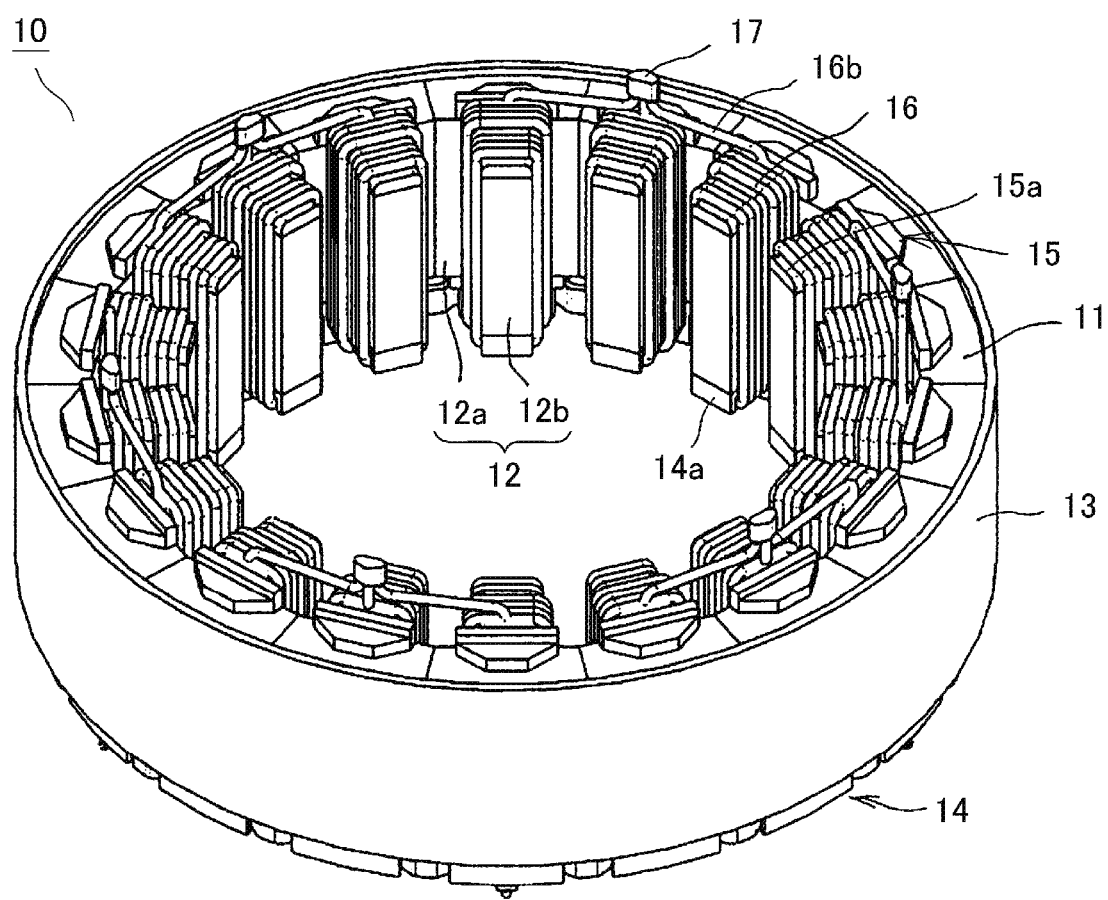
FIG. 5 is an oblique perspective view in which the stator of the rotary electric machine according to Embodiment 1 is viewed from the other end side in a shaft direction.

Hereinafter, a rotary electric machine according to Embodiment 1 and a manufacturing method of the rotary electric machine will be explained in accordance with the drawings. FIG. 1 is a one-side cross-sectional view which indicates a rotary electric machine according to Embodiment 1. FIG. 2 is an oblique perspective view in which a stator of the rotary electric machine according to Embodiment 1 is viewed from one end side in a shaft direction. FIG. 3 is a plane view in which the stator of the rotary electric machine according to Embodiment 1 is viewed from one end side in a shaft direction. FIG. 4 is a cross-sectional view which indicates the stator of the rotary electric machine according to Embodiment 1. FIG. 5 is an oblique perspective view in which the stator of the rotary electric machine according to Embodiment 1 is viewed from the other end side in a shaft direction. In addition, in each of the drawings, the same symbols are given to the same or equivalent parts. Moreover, in FIG. 1, an arrow "Z" indicates a shaft direction of a rotary electric machine 100.

The rotary electric machine 100 according to Embodiment 1 is applied to an electric motor such as a motor which is mounted in a household electric appliance, or a motor which is mounted in an industrial machine, and as indicated in FIG. 1, the rotary electric machine 100 includes a rotor 5 and a stator 10, which are installed in the inside of a housing 1. The housing 1 includes a frame 2, which is configured in a cylinder shape having a bottom and includes a cylinder portion 2a and a bottom portion 2b, and an end plate 3 by which an aperture of the flame 2 is closed. An aluminum material or the like is used for a material of the flame 2. The stator 10 is inserted into the cylinder portion 2a of the frame 2 so as to be fixed. The rotor 5 is rotatably arranged at an inner circumference side of the stator 10.

The rotor 5 is a permanent magnet-type rotor which includes a rotary shaft 6, a rotor core 7, and permanent magnets 8. The rotary shaft 6 is supported to the bottom portion 2b of the frame 2 and the end plate 3 via a bearing 4, and is inserted at a position of a shaft center. The rotor core 7 is fixed to the rotary shaft 6. The permanent magnets 8 are buried at an outer circumference surface side of the rotor core 7 and are arranged, in a circumference direction, with a predetermined pitch, whereby the permanent magnets 8 compose a magnetic pole. In addition, the rotor 5 is not limited to a permanent magnet-type rotor, and it is suitable that a squirrel-cage type rotor, in which a rotor conductor, which is not insulated, is installed in a slot of a rotor core and both sides are shorted by using a short circle, is used, or a winding-type rotor or the like, in which a conductive wire, which is insulated, is mounted at a slot of a rotor core, is used.

As indicated in FIG. 2 through FIG. 5, the stator 10 includes a stator core 11; a bobbin 14 and a bobbin 15, which are made of a resin and are respectively arranged at both end surfaces in a shaft direction of the stator core 11; and coils 16 which are wound around teeth 12b via the bobbin 14 and the bobbin 15. The stator core 11 is configured in such a way that separated cores 12, of which number is 18, are arranged in an annular shape. The separated cores 12 are formed in such a way that a predetermined number of electromagnetic steel sheets are laminated and integrated. Each of the separated cores 12 includes core back portions 12a having an arc shape, and teeth 12b which are protruded from inner circumference wall surfaces of the core back portions 12a to an inner side in a diameter direction of the core back portions 12a.

Any of a U-phase coil 16, a V-phase coil 16, and a W-phase coil 16 is wound around each of the separated cores 12 via the bobbin 14 and the bobbin 14. Moreover, the U-phase coil 16, the V-phase coil 16, and the W-phase coil 16 are respectively connected to a U-phase bus ring 25, a V-phase bus ring 26, and a W-phase bus ring 27. Thereby, at the stator 10, three-phase AC windings, of which number is 6, in which the U-phase coil 16, the V-phase coil 16, and W-phase coil 16 are respectively formed in a Y connection state, are configured. In the rotary electric machine 100, an AC electric current is supplied to the U-phase bus ring 25, the V-phase bus ring 26, and the W-phase bus ring 27 via an inverter at the outside, whereby a rotary magnetic field is generated at the stator 10. The rotor 5 is rotated and driven in accordance with a suction force or a repulsion force, which is caused by the rotary magnetic field.

Figure 6:
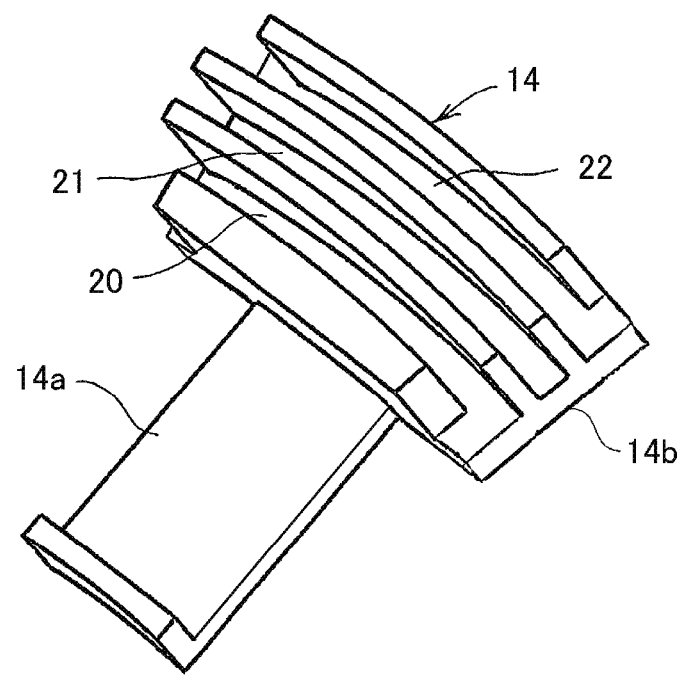
FIG. 6 is an oblique perspective view which indicates a bobbin which composes the stator of the rotary electric machine according to Embodiment 1.

As indicated in FIG. 6, the bobbin 14, which is arranged at one end surface in a shaft direction (at an upper side in FIG. 4) of the separated cores 12, includes a coil winding portion 14a, which is arranged at an end surface in a shaft direction of the teeth 12b, on which the coil 16 is wound; and a flange portion 14b, which is arranged at an end surface in a shaft direction of the core back portions 12a, on which a plurality of a bus ring maintaining portion 20, a bus ring maintaining portion 21, and a bus ring maintaining portion 22 are formed. The U-phase bus ring 25, the V-phase bus ring 26, and the W-phase bus ring 27 are respectively maintained at the bus ring maintaining portion 20, the bus ring maintaining portion 21, and the bus ring maintaining portion 22, which have a ditch shape.

Moreover, as indicated in FIG. 5, the bobbin 15, which is arranged at the other end surface in a shaft direction (at a lower side in FIG. 4) of the separated cores 12, includes a coil winding portion 15a, which is arranged at the end surface in a shaft direction of the teeth 12b, on which the coil 16 is wound. In addition, the bobbin 14 and the bobbin 15 are made of a resin material such as a polybutylene terephthalate resin (PBT) or a polyphenylene sulfide resin (PPS). In addition, it is suitable that the bobbin 14 and the bobbin 15 are fixed to the separated cores 12 from a viewpoint of an easy winding operation of the coils 16. In this case, it can be performed that the bobbin 14 and the bobbin 15 are fixed to the separated cores 12 by using a fitting operation, or the bobbin 14 and the bobbin 15 are fixed to the separated cores 12 by using an adhesive material. In the other case, it is suitable that the bobbin 14 and the bobbin 15 are integrally molded and formed with the separated cores 12.

Figure 7:
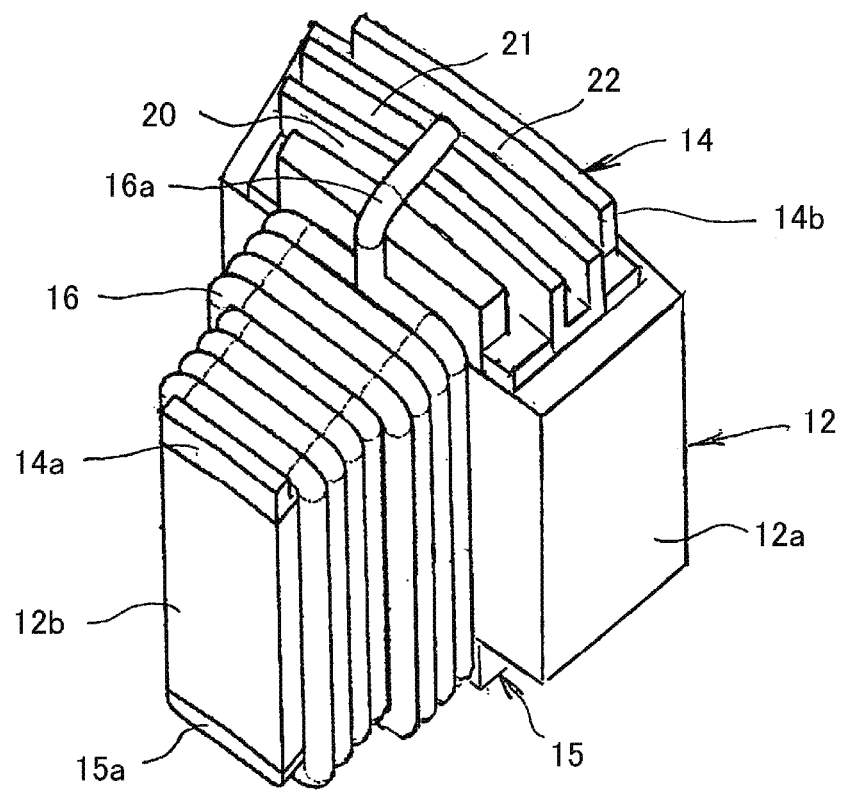
FIG. 7 is an oblique perspective view which indicates a separated core on which a coil, which composes the stator of the rotary electric machine according to Embodiment 1, is wound.

As indicated in FIG. 7, the coils 16 are configured in such a way that a conductive wire, which is composed of a round copper wire on which an insulating film is coated, is wound, with a predetermined number, around the teeth 12b of the separated cores 12, and the coil winding portion 14a and the coil winding portion 15a of the bobbin 14 and the bobbin 15, which are arranged at the end surface in a shaft direction of the teeth 12b. In addition, insulators (not illustrated) are arranged at both side surfaces of the teeth 12b in a circumference direction, whereby an insulation capability between the coils 16 and the separated cores 12 is maintained.

As described above, as indicated in FIG. 2 through FIG. 5, the separated cores 12, of which number is 18, on which the coils 16 are wound, are inserted and fixed, by using a press-inserting method, a burn-fitting method or the like, to the inside of a yoke 13 having a cylinder shape, in a state where the teeth 12b are faced toward an inner side in a diameter direction, and side surfaces of the core back portions 12a in a circumference direction are faced to each other so as to be arranged in an annular shape. The yoke 13 is formed by shaving and processing or by squeezing and processing a single metal material such as an iron, or is formed by laminating and integrating a steel sheet such as an electromagnetic steel sheet.

The coils 16, which are wound around the separated cores 12 so as to be arranged in an annular shape, are repeated and arranged, in a sequence of the U-phase coil 16, the V-phase coil 16, and the W-phase coil 16, in a circumference direction. As indicated in FIG. 2, one terminal 16a of each of the coils 16 is led, toward the bobbin 14 side, in a shaft direction, and is led toward an outer side in a diameter direction in a state where the terminal 16a is bent, at a right angle, between the coil winding portion 14a and the flange portion 14b of the bobbin 14.

As indicated in FIG. 5, the other coil terminal 16b of each of the coils 16 is led toward the bobbin 15 side in a shaft direction. The U-phase coil terminal 16b, the V-phase coil terminal 16b, and the W-phase coil terminal 16b, at a common side, which are led toward the bobbin 15 side, are integrated, and are electrically connected by using a TIG welding method, a laser welding method or the like. A connecting portion at a common side of each of the coils 16 is coated by using an insulating tube 17. In addition, it is suitable that the connecting portion is coated by using a resin mold, an insulating tape or the like.

The U-phase bus ring 25, the V-phase bus ring 26, and the W-phase bus ring 27 are configured in such a way that a plane sheet having a band shape, which is composed of an oxygen free copper, a deoxidized copper, a tough pitch copper or the like, is bent and formed in a ring shape. As indicated in FIG. 2 through FIG. 4, the bus ring 25, the bus ring 26, and the bus ring 27 are respectively fitted to the bus ring maintaining portion 20, the bus ring maintaining portion 21, and the bus ring maintaining portion 22, which are formed at the bobbin 14 and have a ditch shape, and are fixed by using an adhesive material or the like in accordance with a requirement. The bus ring 25, the bus ring 26, and the bus ring 27 are concentrically arranged in a state where the bus ring 25, the bus ring 26, and the bus ring 27 are inserted to the bus ring maintaining portion 20, the bus ring maintaining portion 21, and the bus ring maintaining portion 22. Moreover, each of the bus ring 25, the bus ring 26, and the bus ring 27 includes a coil connecting portion 25a, a coil connecting portion 26a, and a coil connecting portion 27a, which are protruded from the bus ring maintaining portion 20, the bus ring maintaining portion 21, and the bus ring maintaining portion 22 to a shaft direction.

Figure 8:
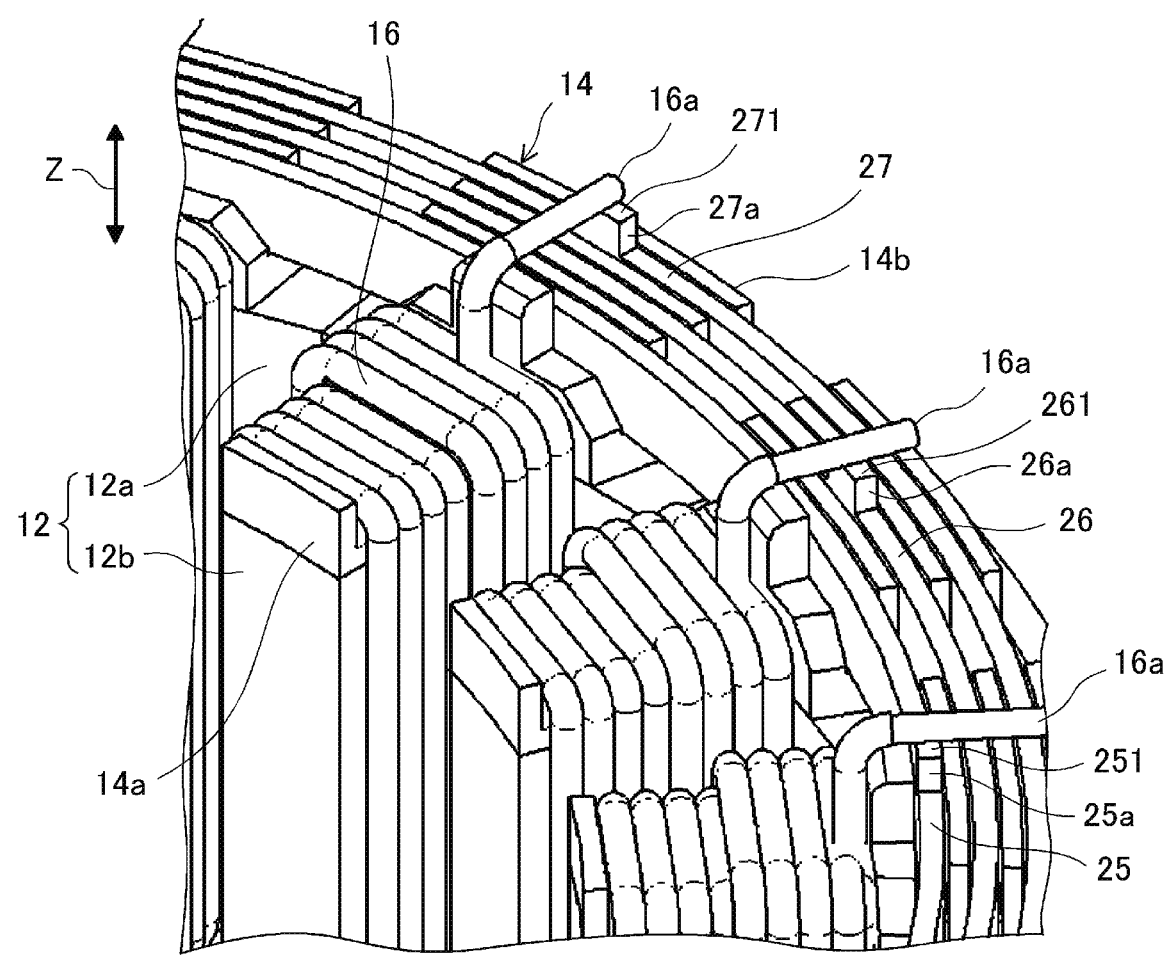
FIG. 8 is an oblique perspective view which indicates a main portion of the stator of the rotary electric machine according to Embodiment 1.
Figure 9:
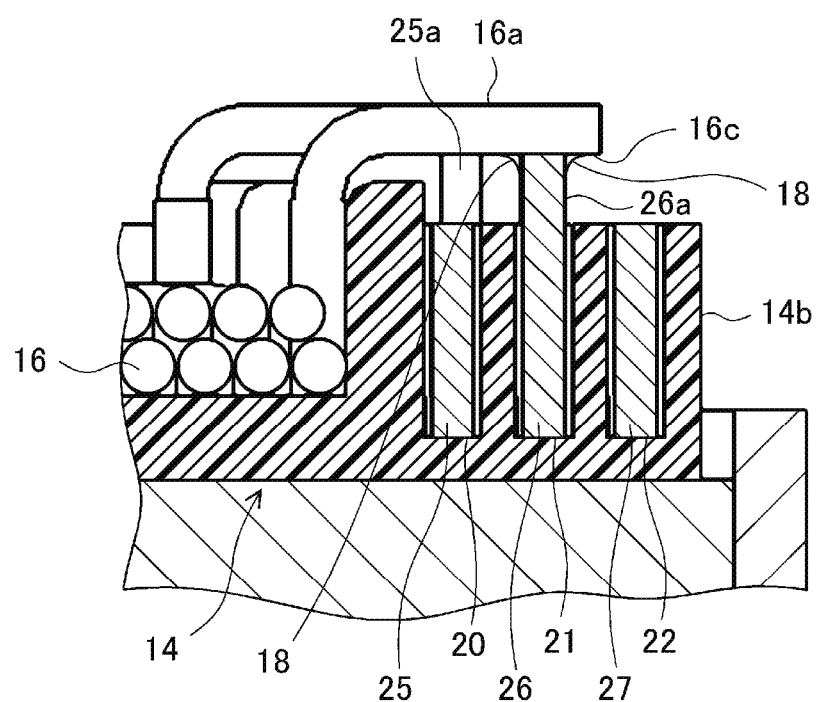
FIG. 9 is a view which indicates connecting portions for bus rings and coil terminals, at the rotary electric machine according to Embodiment 1.

The connecting portions for the coil terminals 16a and the bus ring 25, the bus ring 26, and the bus ring 27 will be minutely explained by using FIG. 8 and FIG. 9. As described above, the U-phase coil terminal 16a, the V-phase coil terminal 16a, and the W-phase coil terminal 16a are led toward the bobbin 14 side in a shaft direction, and are led toward an outer side in a diameter direction in a state where each of the coil terminals 16a is bent at a right angle. Moreover, as indicated in FIG. 8, each of the coil terminals 16a is connected to the coil connecting portion 25a of the bus ring 25, the coil connecting portion 26a of the bus ring 26, and the coil connecting portion 27a of the bus ring 27, which are connection objects.

In other words, the U-phase coil terminal 16a is connected to the coil connecting portion 25a of the U-phase bus ring 25, and the V-phase coil terminal 16a is connected to the coil connecting portion 26a of the V-phase bus ring 26, and the W-phase coil terminal 16a is connected to the coil connecting portion 27a of the W-phase bus ring 27. Each of the coil terminals 16a is connected, by performing a resistance welding process, to a tip portion 251, a tip portion 261, and a tip portion 271, which have a plane shape, of the coil connecting portion 25a, the coil connecting portion 26a, and the coil connecting portion 27a. The resistance welding process is performed in such a way that an electric current is passed between metals, which are welded, while a pressure is applied, and the both metals are welded by using heat which is caused in accordance with a resistance of a metal in itself and a resistance of a contacting portion.

Moreover, as indicated in FIG. 9, the coil terminals 16a are arranged in such a way that the coil terminals 16a are protruded toward an outer side in a diameter direction with respect to the coil connecting portion 26a of the bus ring 26. Thereby, the coil terminals 16a include protruding portions 16c which are protruded toward an outer side in a diameter direction with respect to the coil connecting portion 26a of the bus ring 26. In addition, in FIG. 9, although a connecting portion for the coil connecting portion 26a of the V-phase bus ring 26 and the coil terminals 16a is indicated as an example, a connecting portion for a U-phase and a connecting portion for a W-phase are similarly indicated.

As described above, the coil terminals 16a include the protruding portions 16c, whereby fillets 18 are formed between the coil terminals 16a and the tip portion 261, and between the coil terminals 16a and a side surface at an inner side in a diameter direction of the coil connecting portion 26a, and moreover between the protruding portions 16c and a side surface at an outer side in a diameter direction of the coil connecting portion 26a, so that a connection strength is improved in comparison with a case in which the protruding portions 16c are not included.

In addition, in Embodiment 1, although an example, in which the bobbin 14, which is arranged at one end surface in a shaft direction of the stator core 11, includes the bus ring maintaining portion 20, the bus ring maintaining portion 21, and the bus ring maintaining portion 22, is explained, it is suitable that the bobbin 14 and the bobbin 15, which are arranged at the end surfaces in a shaft direction at both sides of the stator core 11, include the bus ring maintaining portions. In this case, the bobbin 15, which is arranged at the other end surface in a shaft direction of the stator core 11, includes the bus ring maintaining portion by which the bus ring for a common is maintained, and the U-phase coil terminal 16b, the V-phase coil terminal 16b, and the W-phase coil terminal 16b, at a common side, are connected to the coil connecting portions of the bus rings.

As described above, in the rotary electric machine 100 according to Embodiment 1, the coil connecting portion 25a, the coil connecting portion 26a, and the coil connecting portion 27a, which are protruded from the bus ring maintaining portion 20, the bus ring maintaining portion 21, and the bus ring maintaining portion 22 to a shaft direction, are provided at the each of the bus ring 25, the bus ring 26, and the bus ring 27, and the coil terminals 16a are arranged in such a way that the coil terminals 16a are protruded toward an outer side in a diameter direction with respect to the coil connecting portion 25a, the coil connecting portion 26a, and the coil connecting portion 27a, and the coil terminals 16a are connected to the tip portion 251, the tip portion 261, and the tip portion 271, which have a plane shape, of the coil connecting portion 25a, the coil connecting portion 26a, and the coil connecting portion 27a, so that it is not required that a slit and a bent portion or the like are formed, like a conventional rotary electric machine, at a tip of a bus ring, and shapes of the bus ring 25, the bus ring 26, and the bus ring 27 are simplified, whereby the rotary electric machine 100 is easily manufactured.

Moreover, the coil terminals 16a are connected by performing a resistance welding process in a state where the coil terminals 16a are arranged at the tip portion 251, the tip portion 261, and a tip portion 271, which have a plane shape, of the coil connecting portion 25a, the coil connecting portion 26a, and the coil connecting portion 27a, so that a welding board for a welding process and a chuck board for a connecting portion are not required, whereby the rotary electric machine 100 can be downsized. Moreover, the coil terminals 16a are arranged in such a way that the coil terminals 16a are protruded toward an outer side in a diameter direction with respect to the coil connecting portion 25a, the coil connecting portion 26a, and the coil connecting portion 27a, so that the fillets 18 are formed between the protruding portions 16c and the end surfaces of the coil connecting portion 25a, the coil connecting portion 26a, and the coil connecting portion 27a, whereby a high connection strength is obtained.

Moreover, the coil terminals 16a are welded to the coil connecting portion 25a, the coil connecting portion 26a, and the coil connecting portion 27a, whereby a required amount of heat is reduced, when a welding process is performed, in comparison with a case in which the coil terminals 16a are directly welded to the end surfaces in a shaft direction of the bus ring 25, the bus ring 26, and the bus ring 27, and damage to the films of the coils 16 and to the bobbin 14 can be inhibited. Moreover, when a welding process is performed, interference between the bobbin 14 and a tool of a connection facility or the like is inhibited, so that an assembly capability of the stator 10 is improved. Moreover, contact areas of the coil terminals 16a and the coil connecting portion 25a, the coil connecting portion 26a, and the coil connecting portion 27a are limited in accordance with a thickness size of the bus ring 25, the bus ring 26, and the bus ring 27, so that a contact resistance is increased, and a resistance welding process is favorably performed.

Embodiment 2

Figure 10A:
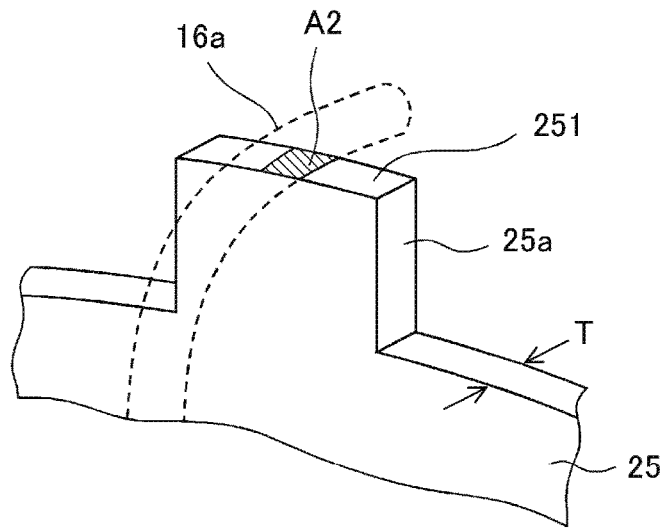
FIG. 10A and FIG. 10B are views which indicate a connecting portion for a bus ring and a coil terminal, at a rotary electric machine according to Embodiment 2.
Figure 10B:
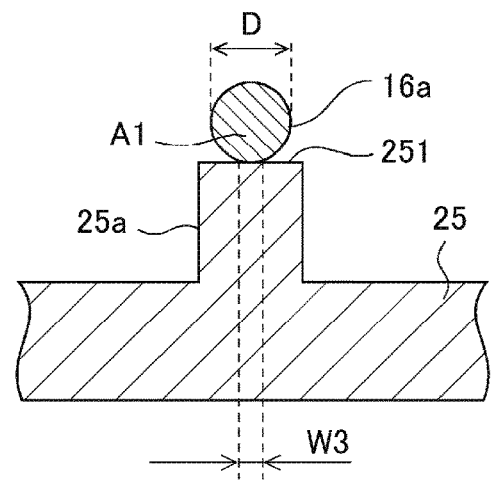
Figure 11:
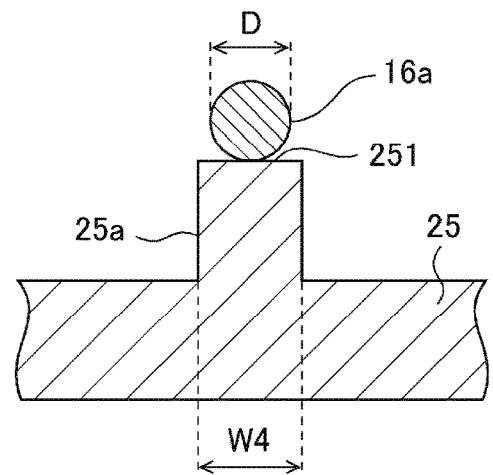
FIG. 11 is a view which indicates a connecting portion for a bus ring and a coil terminal, at the rotary electric machine according to Embodiment 2.

FIG. 10A, FIG. 10B, and FIG. 11 are views which indicate a connecting portion for a bus ring and a coil terminal, at a rotary electric machine according to Embodiment 2. In addition, an overall configuration of the rotary electric machine according to Embodiment 2 is similar to an overall configuration of the rotary electric machine according to Embodiment 1 which is described above, so that an explanation is omitted. In Embodiment 2, a suitable condition of a size of each of elements at a connecting portion of a coil terminal. 16a and a coil connecting portion 25a of a bus ring 25 will be explained.

As indicated in FIG. 10A and FIG. 10B, when a thickness size of the bus ring 25 is set as "T", and a contact width of the coil terminal. 16a and the coil connecting portion 25a of the bus ring 25 is se as "W3", and a contact area of the coil terminal. 16a and the bus ring 25, after a welding process is performed, is set as "A2", the contact area "A2" is calculated by the following formula.

$$A2 = W3 \times T$$

When a cross-sectional area of the coil terminal. 16a is set as "A1", it is desirable that the following formula is realized.

$$A1 < A2$$

Thereby, an electric current density of the connecting portion of the coil connecting portion 25a and the coil terminal. 16a is smaller than an electric current density of a coil 16, and heat generation at the connecting portion can be inhibited.

Moreover, as indicated in FIG. 11, when a diameter of the coil terminal. 16a is set as "D", a width of a tip portion 251 of the coil connecting portion 25a in a circumference direction is set as "W4", it is desirable that the following formula is realized.

$$D < W4$$

Thereby, a shape of a fillet at the connecting portion of the coil terminal. 16a and the coil connecting portion 25a is stabilized. In the rotary electric machine according to Embodiment 2, it is realized that an effect, which is similar to the above-described effect according to Embodiment 1, is obtained, and moreover, it is realized that a connection strength and quality are improved.

Embodiment 3

Figure 12A:
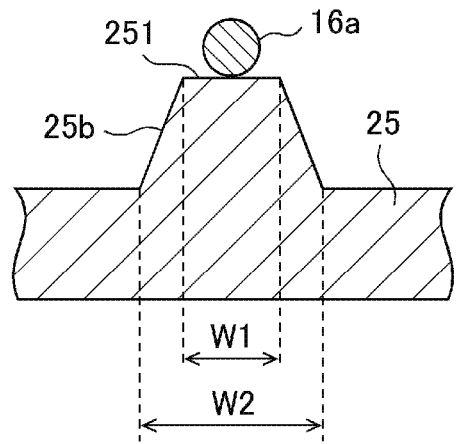
FIG. 12A, FIG. 12B, and FIG. 12C are views which indicate connecting portions for a bus ring and a coil terminal, at a rotary electric machine according to Embodiment 3.
Figure 12B:
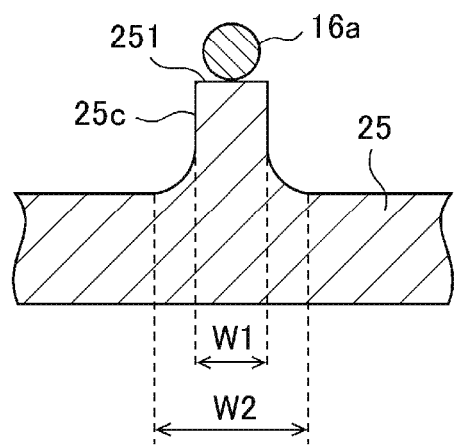
Figure 12C:
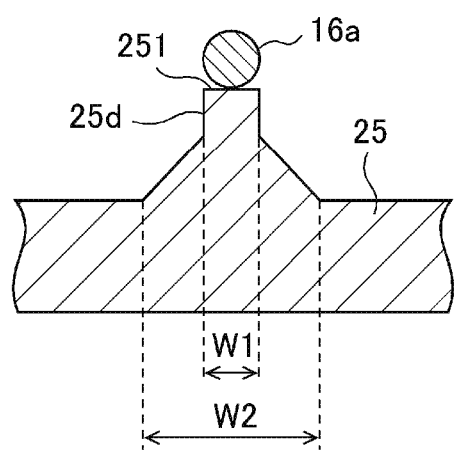

FIG. 12A, FIG. 12B, and FIG. 12C are views which indicate connecting portions for a bus ring and a coil terminal, at a rotary electric machine according to Embodiment 3. In Embodiment 3, a deformation example of the coil connecting portion 25a according to Embodiment 1, which is described above, will be explained. In addition, an overall configuration of the rotary electric machine according to Embodiment 3 is similar to an overall configuration of the rotary electric machine according to Embodiment 1, which is described above, so that an explanation is omitted.

As indicated in FIG. 12A through FIG. 12C, each of a coil connecting portion 25b, a coil connecting portion 25c, and a coil connecting portion 25, according to Embodiment 3, is formed in such a way that widths "W1" of tip portions 251 in a circumference direction are narrower than widths "W2" of bases in a circumference direction. At the coil connecting portion 25b which is indicated in FIG. 12A, side surfaces are formed as inclined surfaces having a predetermined angle. At the coil connecting portion 25c which is indicated in FIG. 12B, side surfaces are formed as curved surfaces having a fillet shape. Moreover, at the coil connecting portion 25d which is indicated in FIG. 12C, the coil connecting portion 25d has a chamfered shape in which portions of side surfaces are formed as inclined surfaces.

In the rotary electric machine according to Embodiment 3, it is realized that an effect, which is similar to the above-described effect according to Embodiment 1, is obtained, and the coil connecting portion 25b, the coil connecting portion 25c, and the coil connecting portion 25d are formed in such a way that the widths "W2" of the bases of the coil connecting portion 25b, the coil connecting portion 25c, and the coil connecting portion 25d are wider than the widths "W11" of the tip portions 251, so that it is realized that a strength is improved while thermal diffusion of the coil connecting portion 25b, the coil connecting portion 25c, and the coil connecting portion 25d is prevented.

Embodiment 4

Figure 13:
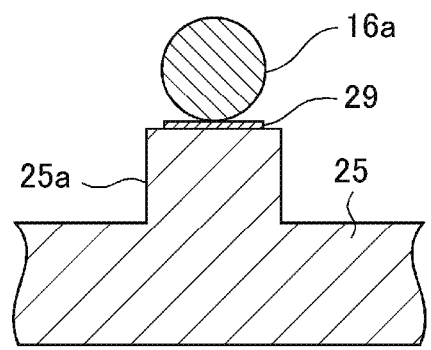
FIG. 13 is a view which indicates a connecting portion for a bus ring and a coil terminal, at a rotary electric machine according to Embodiment 4.

FIG. 13 is a view which indicates a connecting portion for a bus ring and a coil terminal, at a rotary electric machine according to Embodiment 4. In Embodiment 4, a deformation example of the coil connecting portion 25a according to Embodiment 1, which is described above, will be explained. In addition, an overall configuration of the rotary electric machine according to Embodiment 4 is similar to an overall configuration of the rotary electric machine according to Embodiment 1, which is described above, so that an explanation is omitted.

In the rotary electric machine according to Embodiment 4, a wax material 29 is arranged between a coil terminal 16a and a coil connecting portion 25a of a bus ring 25. A flux, by which an oxide film is removed, is not required, so that it is suitable that a phosphorus copper wax is used as the wax material 29. The wax material 29 is arranged, whereby a weld temperature can be lowered in comparison with a case in which coils 16 and the coil connecting portion 25a are directly welded.

In the rotary electric machine according to Embodiment 4, it is realized that an effect, which is similar to the above-described effect according to Embodiment 1, is obtained, and moreover, the wax material 29 is arranged between the coil terminal 16a and the coil connecting portion 25a, whereby a required amount of heat is reduced, when a welding process is performed, in comparison with a case in which the wax material 29 is not arranged, so that damage to the films of the coils 16 and to a bobbin 14 can be inhibited. Moreover, a phosphorus copper wax is used as the wax material 29, whereby the flux is not required, so that a welding process can be performed by using a simple facility.

Embodiment 5

Figure 14:
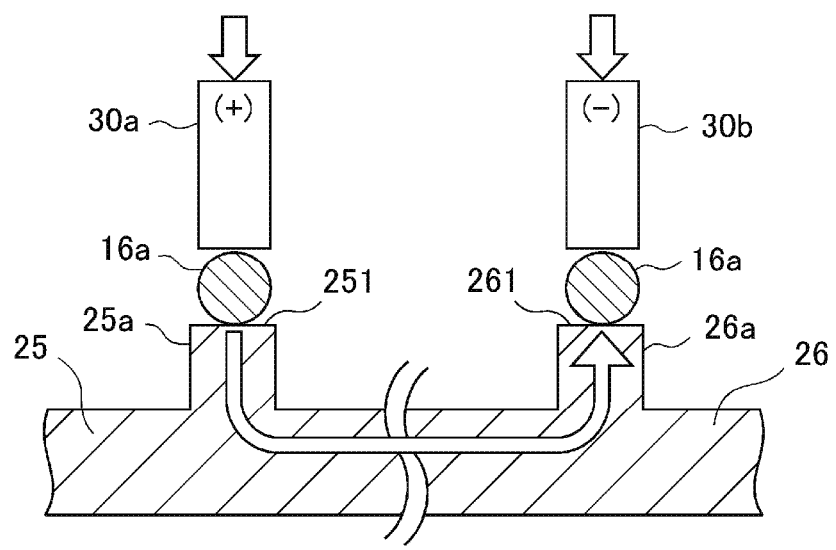
FIG. 14 is a view which explains a manufacturing method of a rotary electric machine according to Embodiment 5.

FIG. 14 is a view which explains a manufacturing method of a rotary electric machine according to Embodiment 5. In addition, an overall configuration of the rotary electric machine, which is manufactured in accordance with Embodiment 5, is similar to an overall configuration of the rotary electric machine 100 according to Embodiment 1, which is described above, so that FIG. 8 and FIG. 9 are diverted, and an explanation for each of configuration elements is omitted.

The manufacturing method of the rotary electric machine according to Embodiment 5 will be explained by using FIG. 8, FIG. 9, and FIG. 14. Firstly, as a first step, a plurality of a bus ring 25, a bus ring 26, and a bus ring 27, which are made of a plane sheet having a band shape, are inserted to a bus ring maintaining portion 20, a bus ring maintaining portion 21, and a bus ring maintaining portion 22, which have a ditch shape, which are formed at a bobbin (a bobbin 14 in FIG. 8 and FIG. 9) which is arranged on at least one of end surfaces in a shaft direction of a stator core 11.

The U-phase bus ring 25, the V-phase bus ring 26, and the W-phase bus ring 27 are bent in a ring shape so as to be formed, and the U-phase bus ring 25, the V-phase bus ring 26, and the W-phase bus ring 27 are respectively fitted to a bus ring maintaining portion 20, a bus ring maintaining portion 21, and a bus ring maintaining portion 22, and are fixed by using an adhesive material or the like in accordance with a requirement. In addition, it is suitable that the bus ring maintaining portions are formed at a bobbin 15 which is arranged at the other end surface in a shaft direction of the stator core 11.

In a next process as a second step, coil terminals 16a, which are connection objects, are arranged at each of a coil connecting portion 25a of the bus ring 25, a coil connecting portion 26a of the bus ring 26, and a coil connecting portion 27a of the bus ring 27, which are protruded from the bus ring maintaining portion 20, the bus ring maintaining portion 21, and the bus ring maintaining portion 22 to a shaft direction. As indicated in FIG. 9, the coil terminals 16a are bent, at right angles, between a coil winding portion 14a and a flange portion 14b of the bobbin 14, and are led toward an outer side in a diameter direction. Moreover, the coil terminals 16a are arranged in such a way that the coil terminals 16a are protruded toward an outer side in a diameter direction with respect to the coil connecting portion 25a, the coil connecting portion 26a, and the coil connecting portion 27a.

In a next process as a third step, as indicated in FIG. 14, a plus electrode 30a and a minus electrode 30b of an AC power supply are respectively arranged at the coil terminals 16a which are arranged at the adjacent coil connecting portion 25a and the coil connecting portion 26a, and the electrode 30a and the electrode 30b are energized while the plus electrode 30a and the minus electrode 30b are pressed in a direction of the coil connecting portion 25a and the coil connecting portion 26a, and resistance welding processes of the coil terminals 16a are concurrently performed to the coil connecting portion 25a and the coil connecting portion 26a at two positions. In addition, although a DC power supply can be used for a power supply by which the electrode 30a and the electrode 30b are energized, the AC power supply is used, whereby a deviation of a welding state, which is caused by the Peltier effect, can be prevented.

In the manufacturing method of the rotary electric machine according to Embodiment 5, the coil terminals 16a can be concurrently welded to the coil connecting portion 25a and the coil connecting portion 26a at two positions, so that productivity is improved in comparison with a case in which the coil terminals 16a are welded at every one position. Moreover, the electrode 30a and the electrode 30b are arranged at the coil terminals 16a which are arranged at the adjacent coil connecting portion 25a and the coil connecting portion 26a, and the electrode 30a and the electrode 30b are energized, so that an energization passage can be shortened, and damage, which is caused by heat, to coils 16 and the bobbin 14 can be inhibited.

The coil terminals 16a are arranged at a tip portion 251 and a tip portion 261, which have a flat shape, of the coil connecting portion 25a and the coil connecting portion 26a, and the coil terminals 16a are welded while the coil terminals 16a are pressed, so that it can be prevented that positions of the coil terminals 16a are deviated, and a stable welding process, of which reliability is high, can be performed. Moreover, the coil terminals 16a are arranged in such a way that the coil terminals 16a are protruded toward an outer side in a diameter direction with respect to the coil connecting portion 25a, the coil connecting portion 26a, and the coil connecting portion 27a, so that fillets 18 are formed between the side surfaces, of the coil connecting portion 25a and the coil connecting portion 26a, and protruding portions 16c of the coil terminals 16a, whereby a high connection strength is obtained. Moreover, a welding board for a welding process and a chuck board for a connecting portion are not required, so that it can be realized that the rotary electric machine is downsized.

In the disclosed present invention, although various and exemplary embodiments are described, various characteristics, modes, and functions, which are described in one or a plurality of embodiments, are not limited to an applicability of a specific embodiment, and can be applied to the embodiments in a single state or in various combination states. Therefore, countless deformation examples, which are not exemplified, are assumed in a field of a technology which is disclosed in the specification of the present invention. For example, it is assumed that a case in which at least one of components is deformed, and a case in which at least one of components is added, or a case in which at least one of components is omitted, and moreover, a case in which at least one of components is extracted and combined to a component of the other embodiment, are included.

What is claimed is:

1. A rotary electric machine comprising:
   a stator which includes a stator core which includes teeth which are protruded from inner circumference wall surfaces of core back portions having an arc shape, bobbins which are made of a resin and are respectively arranged on end surfaces in a shaft direction at both sides of the stator core, and coils which are wound around the teeth via the bobbins; and
   a rotor which is rotatably arranged at an inner circumference side of the stator; wherein
   the bobbins, which are arranged on at least one of the end surfaces in the shaft direction of the stator core, include coil winding portions, which are arranged at an end surface in the shaft direction of the teeth, on which the coils are wound; and flange portions, which are arranged at an end surface in the shaft direction of the core back portions, at which a plurality of bus ring maintaining portions are formed, and
   a plurality of bus rings, which are made of a plane sheet having a band shape, are concentrically arranged in a state where the bus rings are inserted to the bus ring maintaining portions, and each of the bus rings includes coil connecting portions which are protruded from the bus ring maintaining portions to the shaft direction, and
   terminals of the coils are arranged in such a way that the terminals of the coils are protruded toward an outer side in a diameter direction with respect to the coil connecting portions, and the terminals of the coils are connected to plane tip portions at ends of the coil connecting portions in the shaft direction,
   wherein a contact area of a coil connecting portion among the coil connecting portions and a terminal of a coil among the terminals of the coils is greater than a cross-sectional area of the terminal of the coil,
   the coil connecting portions are formed in such a way that widths of the tip portions in a circumference direction are narrower than widths of bases of the coil connecting portions in the circumference direction, and
   fillets are provided between the terminals of the coils and the tip portions of the coil connecting portions, between the terminals of the coils and side surfaces at an inner side in the diameter direction of the coil connecting portions, and between protruding portions of the terminals of the coils protruded toward an outer side in the diameter direction with respect to the coil connecting portions and side surfaces at an outer side in the diameter direction of the coil connecting portions.

2. A rotary electric machine as recited in claim 1, wherein the terminals of the coils are bent, at right angles, between the coil winding portions and the flange portions of the bobbins, and are led toward an outer side in the diameter direction.

3. A rotary electric machine as recited in claim 1, wherein the coil connecting portions are formed in such a way that the widths of the tip portions in the circumference direction are wider than or equal to wire diameters of the terminals of the coils.

4. A rotary electric machine as recited in claim 2, wherein the coil connecting portions are formed in such a way that the widths of the tip portions in the circumference direction are wider than or equal to wire diameters of the terminals of the coils.

5. A rotary electric machine as recited in claim 1, wherein a wax material is arranged between the coil connecting portions and the terminals of the coils.

6. A rotary electric machine as recited in claim 2, wherein a wax material is arranged between the coil connecting portions and the terminals of the coils.

7. A rotary electric machine as recited in claim 3, wherein a wax material is arranged between the coil connecting portions and the terminals of the coils.

8. A manufacturing method of a rotary electric machine, comprising:
   a first step in which a plurality of bus rings, which are made of a plane sheet having a band shape and coil connecting portions with plane tip portions, are inserted to bus ring maintaining portions having a ditch shape, which are formed at bobbins which are arranged on at least one of end surfaces in a shaft direction of a stator core;
   a second step in which terminals of coils, which are connection objects, are each arranged at the tip portion at an end of one of the coil connecting portions in the shaft direction, which are protruded from the bus ring maintaining portions to the shaft direction, of each of the bus rings; and a third step in which electrodes are respectively arranged at the terminals of the coils which are arranged at the adjacent coil connecting portions, and the electrodes are energized while the electrodes are pressed in a direction of the coil connecting portions, and resistance welding processes of the terminals of the coils are concurrently performed to the coil connecting portions at two positions, wherein a contact area of a coil connecting portion among the coil connecting portions and a terminal of a coil among the terminals of the coils is greater than a cross-sectional area of the terminal of the coil, the coil connecting portions are formed in such a way that widths of the tip portions in a circumference direction are narrower than widths of bases of the coil connecting portions in the circumference direction, the terminals of the coils are arranged, in the second step, in such a way that the terminals of the coils are protruded toward an outer side in a diameter direction with respect to the coil connecting portions, and fillets are formed, in the third step, between the terminals of the coils and the tip portions of the coil connecting portions, between the terminals of the coils and side surfaces at an inner side in the diameter direction of the coil connecting portions, and between protruding portions of the terminals of the coils protruded toward an outer side in the diameter direction with respect to the coil connecting portions and side surfaces at an outer side in the diameter direction of the coil connecting portions.

9. A rotary electric machine as recited in claim 1, wherein the terminals of the coils are protruded toward an outer side in the diameter direction with respect to the coil connecting portions while crossing over the tip portions of the coil connecting portions in the diameter direction, and overlap the tip portions within widths of the tip portions in the circumference direction.

10. A rotary electric machine as recited in claim 1, wherein surfaces connecting the tip portions and the bases are flat surfaces, in the coil connecting portions.

* * * * *